Jan. 13, 1970     R. G. GALLAGHER     3,488,828
MEANS AND METHOD FOR INSERTING A STRUCTURAL GASKET LOCKING STRIP
Filed Nov. 30, 1967     2 Sheets-Sheet 2

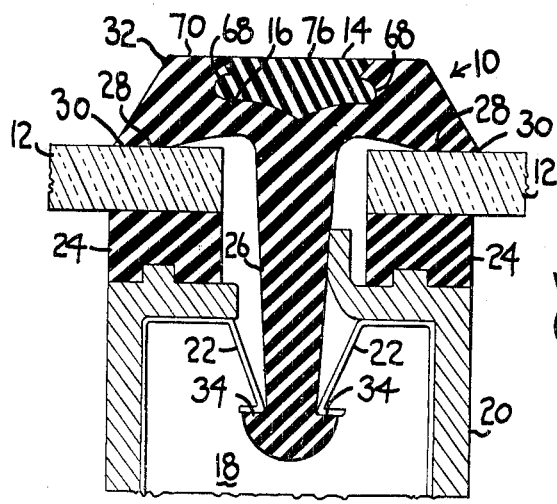
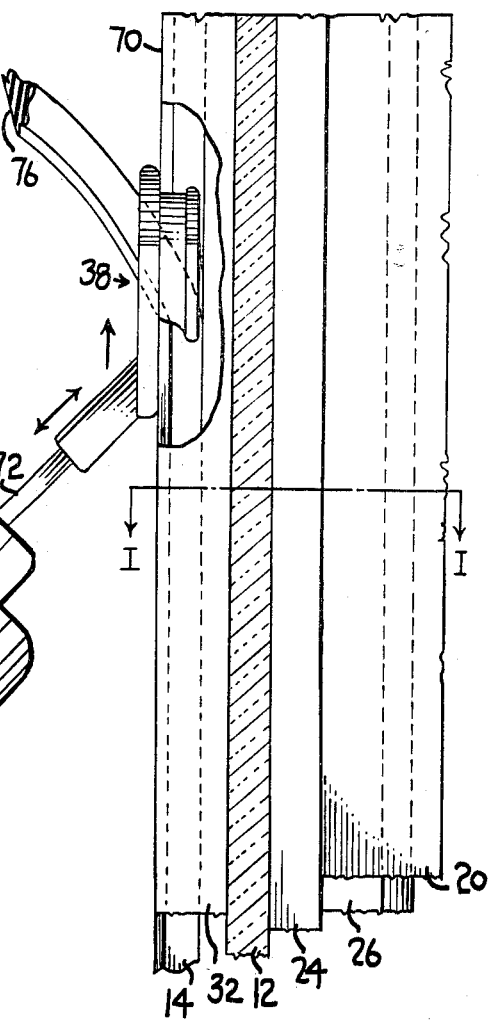

INVENTOR
RAYMOND G. GALLAGHER
BY
ATTORNEYS

United States Patent Office 3,488,828
Patented Jan. 13, 1970

3,488,828
MEANS AND METHOD FOR INSERTING A STRUCTURAL GASKET LOCKING STRIP
Raymond G. Gallagher, Pittsburgh, Pa., assignor to PPG Industries, Inc., a corporation of Pennsylvania
Filed Nov. 30, 1967, Ser. No. 686,946
Int. Cl. B23p 11/02, 19/02
U.S. Cl. 29—451                                                         8 Claims

ABSTRACT OF THE DISCLOSURE

In a method for inserting a locking strip into a groove in a resilient gasket member, which includes the steps of inserting a spreading tool into the groove to spread the groove at least as wide as the locking strip, inserting a portion of the locking strip into the groove subjacent a contacting portion of the tool and moving the tool longitudinally of the groove and the locking strip, the improvement comprising applying intermittent impacts to the tool to urge the tool along the groove while the contacting portion of the tool contemporaneously presses the locking strip into the groove.

BACKGROUND OF THE INVENTION

This invention relates to resilient gaskets having a locking or filler strip and, more specifically, to an improved means and method for inserting an elastomeric locking strip into a groove in an elastomeric structural glazing gasket.

Elastomeric gasket members have been used in the past to structurally support, sealingly retain and cushion panels, such as plate glass or window glass, when mounted in the walls of a building. Examples of these gasket members, as relates to curtain wall construction, may be found in U.S. Patent No. 3,336,707 and copending application Ser. No. 596,285, both assigned to the assignee of the present invention. As therein disclosed, these gasket members generally comprise an elongated elastomeric body having a longitudinally extending groove that receives and retains a gasket locking strip. When the locking strip is inserted within the groove, portions of the elastomeric gasket material are crowded or compressed to cause the gasket material to engage a glass panel and/or other rigid material more tightly. The locking strip may be a wedge-shaped member insertable into a wedge-receiving recess in the body of the gasket, or it may be a cylindrical member or a member of any of a number of shapes insertable into a correspondingly shaped groove for the purpose of forcing the gasket material into tight engagement with an adjacent panel or structural element.

In the past, locking strips were inserted into elastomeric gaskets by applying a detergent or soap solution or other lubricant liberally to the gasket channel or groove, inserting a spreading tool into the groove to spread the groove at least as wide as the locking strip, inserting a portion of the locking strip into the groove subjacent a contacting portion of the tool, and manually moving the tool longitudinally of the groove and the locking strip to contemporaneously spread the groove while the contacting portion of the tool presses the locking strip into the groove.

The foregoing installation procedure has been found to be extremely laborious and time-consuming. Under relatively normal conditions, it was possible in the past for a glazier to insert from about 2 to 4 feet of locking strip per minute in a gasket designed for 8–10 pounds per lineal inch gasket lip-seal pressure and composed of 70–90 durometer (Shore A) neoprene rubber. Under more severe conditions of installation, such as cold weather, working on scaffolding and the like, the rate of locking strip installation is greatly reduced. Accordingly, it is the object of this invention to facilitate insertion of locking strips in glazing gaskets by providing an improved means and method for rapidly and positively applying intermittent impacts to the tool so that the locking strip can be installed quickly and easily with a minimum of effort and time expended. The foregoing and other features and advantages of this invention will be better understood when reference is had to the accompanying drawings, wherein similar parts are usually designated by the same numeral and in which:

FIG. 1 is a typical cross-section along the line I—I of FIG. 2 showing details of an elastomeric structural glazing gasket and locking strip;

FIG. 2 is a side view of the structure of FIG. 1 with portions cut away and other portions in section, and illustrating the preferred means and method of the present invention for installing a locking strip;

Figure 3:
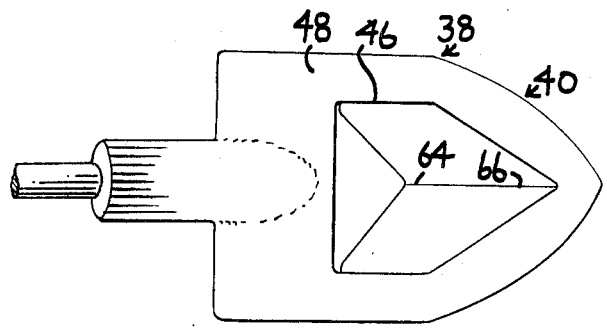
FIG. 3 is an enlarged plan or top view of the tool shown in FIG. 2 with the locking strip and other details removed for the sake of clarity.

Shown in FIG. 1 is a cross-section of part of a structural gasket curtain wall construction disclosed in U.S. Patent No. 3,336,707. In this construction, the structural glazing gasket 10 is an elongated T-shaped member made of natural or synthetic rubber or other elastomeric material which extends completely around the periphery of each of the panels 12. An elongated wedge-shaped locking strip 14, composed of the same or a similar elastomeric material, is received in longitudinally extending groove or wedge-receiving recess 16 in gasket member 10. Gasket 10 is secured within a mounting groove 18 provided in each of the horizontal and vertical frame or stiffening members 20, a portion of one of which is shown. A pair of flat springs or spring clips 22 are held in place within groove 18 and provide gasket engagement means for locking and retaining the structural glazing gasket 10 within mounting groove 18.

The curtain wall structure shown in FIG. 1 is assembled by fastening resilient backing strips 24 to a rigid frame or framework of stiffening members 20, then positioning panel 12 on the thus-formed framework of resilient backing strips, inserting the leg or tongue 26 of the T-shaped structural glazing gasket 10 into groove 18 far enough so that the backing strips 24 and the panel-engaging face 28 and sealing lip 30 on the arms or body portion 32 of the gasket are slightly compressed or deformed on the surface of the panel and the protruding lips 34 on tongue 26 snap into and lock with flat springs 22, and then inserting the wedge or locking strip 14 into wedge or locking strip recess 16 to force the panel-engaging face 28 and sealing lip 30 into positive sealing engagement with panel 12.

Figure 4:
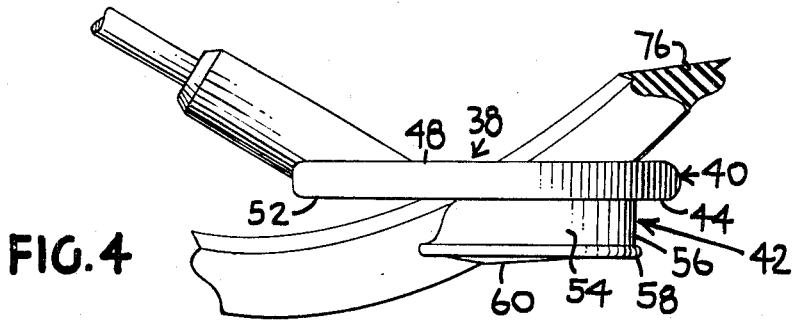
FIG. 4 is an enlarged side view of the tool shown in FIG. 2 with the locking strip in place but with the glazing gasket and other details removed.
Figure 5:
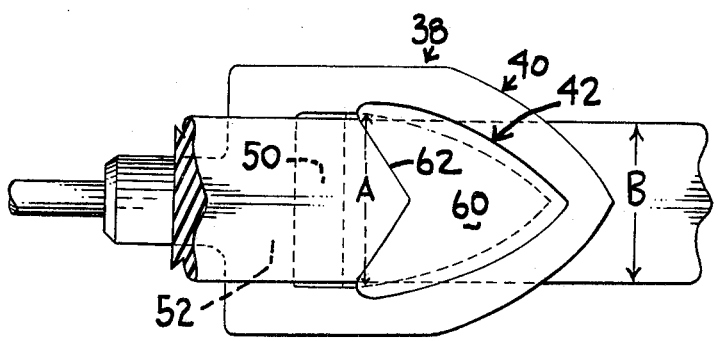
FIG. 5 is an enlarged bottom view of the tool shown in FIG. 2 with the locking strip in place but with the glazing gasket and other details removed.

Illustrated in FIG. 2 is the means and method of the present invention for inserting a wedge or locking strip into an elastomeric structural glazing gasket, such as that shown in FIG. 1. In the preferred embodiment of this invention, a power-driven hammer 36 is employed in combination with a locking strip inserting tool 38 to provide means for applying intermittent impacts to the tool 38 to urge the tool longitudinally along the groove 16. As best shown in FIGS. 3 to 5, tool 38, in the embodiment shown, comprises a plate-like shoe portion 40 with a cuneiform channel-wedging or channel-spreading portion 42 depending from the lower surface 44 thereof. Tool 38 is preferably composed of metal. Shoe portion 40 of tool 38 has an opening or aperture 46 shaped generally in conformity with the transverse shape of locking strip 14 and extending angularly therethrough. Aperture 46 is provided for the purpose of inserting locking strip 14 therein at an acute angle relative to the leading portion of the upper surface 48 of shoe 40 and thence into the groove 16 subjacent the trailing portion of the lower surface of shoe 40. The trailing portion of the lower surface of shoe 40 adjacent the trailing edge and inclined surface 50 of aperture 46 comprises a heel portion 52 of tool 38. Heel portion 52 provides at least point contact with the subjacent surface portion of locking strip 14 to press the locking strip into groove 16 as the tool is moved longitudinally of the groove and the locking strip with the cuneiform or arrow-shaped channel-spreading portion thereof disposed in groove 16.

Arrow-shaped portion 42 of tool 38 has vertical side surfaces 54 extending rearwardly from its vertical leading edge 56. Vertical side surfaces 54 are joined by a bead 58 to a generally flat bottom surface 60. The trailing edge 62 of arrow-shaped portion 42 is V-shaped as viewed from the bottom and has adjacent inclined V-shaped surface portions 64 that are coplanar with corresponding V-shaped surface portions 66 forming a part of the opening or aperture in shoe portion 40. The distance A between side surfaces 54 at or near the trailing edge of arrow-shaped portion 42 is greater than the maximum transverse dimension B of locking strip 14. Accordingly, when arrow-shaped portion 42 is inserted in groove 16, the side surface portions at or near its trailing edge spread channel or groove 16 sufficiently wide to receive locking strip 14. The locking strip 14 has a relatively loose fit in aperture 46 so that there is no significant frictional contact or resistance between locking strip 14 and tool 38. Bead portion 58 of arrow-shaped portion 42 rides in grooves 68, forming a part of channel 16, and help to avoid disengagement of tool 38 from channel 16. The lower surface of shoe portion 40 of tool 38 essentially rides on or is only spaced a slight distance above the outer exposed surface 70 of gasket 10.

With the foregoing description in mind, and with particular reference to FIG. 2, it will be apparent that tool 38 is attached by means of a suitable shaft 72 to the chuck 74 of power-driven hammer 36. The tool 38 has an arrow-shaped portion 42 inserted in groove 16 whereby the side surface portions thereof at or near its trailing edge spread the groove 16 a distance A that is slightly wider than the maximum width B of the locking strip 14. A portion of locking strip 14 may be inserted into the aperture 46 in tool 38 prior to insertion of the arrow-shaped portion of the tool into groove 16 or, alternatively, an end portion of locking strip 14 may be inserted into aperture 46 after the arrow-shaped portion of the tool is inserted into groove 16. In any event, as thus disposed, heel portion 52 of the tool 38 at or near the trailing edge of aperture 46 is in superposed contacting relation with the adjacent outer surface 76 of locking strip 14 and provides at least point contact with the subjacent surface portion of locking strip 14.

Shaft 72, as shown, is disposed at about a 30 degree angle to the trailing portion of the upper surface 48 of tool 38. Actuation of hammer 36 develops a short stroke, e.g., 1/8 to 1/4 inch, reciprocating or vibrating motion in shaft 72, as shown by the double-headed arrow in FIG. 2. This reciprocating motion translates into a principal force component longitudinally of the groove 16 and the locking strip 14 (indicated by the single-headed arrow) and a secondary force component (not shown) normal to the flat outer surface 76 of the locking strip 14. The principal force component urges the tool along the groove while the contacting portion of the tool contemporaneously presses the locking strip 14 into the groove 16. As will be understood, development of the secondary force component is a necessary consequence of disposing shaft 72 at an angle to tool 38 in order to obtain clearance for hammer 36. It has been found, however, that this secondary force component also eliminates some of the drag or frictional resistance between tool 38 and gasket 10 as the tool progresses longitudinally of the groove 16.

By way of a specific example, a "Black and Decker" electric hammer, Catalog No. 102, delivering from 2300 (rated load) to 3200 (no load) blows per minute and having a reciprocating stroke of 1/8 to 1/4 inch was affixed to the tool shown in FIGS. 3 to 5 and used to install locking strips in the gasketed construction shown in FIG. 1. With no lubrication of the gasket channel 16, it was found to be possible to readily insert upwards of 20 feet of locking strip per minute around the periphery of a vertically disposed panel, compared to 2 to 4 feet per minute by manual means with adequate lubricant present. Accordingly, the practice of the present invention permits inserting from 5 to 10 times more locking strips per minute than was previously attainable. Also, while use of a lubricant is not considered to be essential to the practice of the present invention, its use has been desirably retained, in certain instances, not only to facilitate insertion of the locking strip, but also to control or minimize frictional wear on the operative surfaces of the locking strip tool 38.

While the preferred embodiment of this invention has been illustrated and described, it will be understood that various changes and modifications in the procedural steps, as well as in the materials, shapes, arrangement of parts and components, within the range of equivalents other than those specifically mentioned, may be made within the scope of the appended claims without departing from the spirit of the invention.

I claim:

1. In a method for inserting a locking strip into a groove in a resilient gasket member, which includes the steps of inserting a spreading tool into the groove to spread the groove at least as wide as the locking strip, inserting a portion of the locking strip into the groove subjacent a contacting portion of the tool and moving the tool longitudinally of the groove and the locking strip, the improvement comprising applying intermittent impacts to the tool to urge the tool along the groove while the contacting portion of the tool contemporaneously presses the locking strip into the groove.

2. The method of claim 1 wherein a lubricant is applied to the gasket groove prior to pressing the locking strip into the groove.

3. The method of claim 1 wherein the intermittent impacts are applied by transmitting a rectilinear force to the tool in the direction of its movement.

4. The method of claim 3 wherein the rectilinear force is accompanied by transmitting a force component to the tool normal to the direction of its movement.

5. The method of claim 1 wherein the intermitttnt impacts are applied by imparting a vibrating motion to the tool to move the tool longitudinally of the groove while contemporaneously pressing the locking strip into the groove.

6. The method of claim 5 wherein the vibrating motion is applied to the tool at an acute angle relative to the direction of movement of the tool.

7. In apparatus for inserting a locking strip into a groove in a resilient gasket member which includes a spreading tool for insertion into the groove to spread the groove at least as wide as the locking strip and means forming a part of said tool for contacting a subjacent portion of the locking strip to contemporaneously press the locking strip into the groove as the tool moves longitudinally of the groove and the locking strip, the improvement comprising power transmitting means associated with said tool to transmit intermittent impacts to the tool and urge the tool along its direction of movement.

8. The apparatus of claim 7 wherein the power transmitting means is a power-driven hammer.

References Cited

UNITED STATES PATENTS

| | | | |
|---|---|---|---|
| 2,189,138 | 2/1940 | Eichner | 29—235 |
| 2,533,367 | 12/1950 | Gruszecki | 29—235 |
| 3,232,395 | 2/1966 | La Barge | 52—395 |
| 3,363,303 | 1/1968 | Hodgson et al. | 29—235 |

GERALD A. DOST, Primary Examiner

U.S. Cl. X.R.

29—235; 52—395, 468